US007644896B1

(12) United States Patent
Niner

(10) Patent No.: US 7,644,896 B1
(45) Date of Patent: Jan. 12, 2010

(54) UTILITY WIRE-HOLDING APPARATUS AND ASSOCIATED METHOD

(76) Inventor: Francis R. Niner, HC 32 Box 164, Petersburg, WV (US) 26847-9603

( * ) Notice: Subject to any disclaimer, the term of this patent is extended or adjusted under 35 U.S.C. 154(b) by 0 days.

(21) Appl. No.: 12/075,775

(22) Filed: Mar. 13, 2008

(51) Int. Cl.
*F16M 13/00* (2006.01)

(52) U.S. Cl. ....................... 248/159; 248/121; 248/170; 248/431

(58) Field of Classification Search ................. 248/431, 248/170, 528, 164, 163.1, 440.1, 121, 159
See application file for complete search history.

(56) References Cited

U.S. PATENT DOCUMENTS 2,189,687 A * 2/1940 Thomas ...................... 248/523
3,013,584 A 12/1961 Reed
3,759,623 A * 9/1973 Hesse ......................... 403/298
3,908,943 A * 9/1975 Bannister .................... 248/159
4,586,844 A * 5/1986 Hammonds et al. ......... 403/287
4,921,190 A * 5/1990 Russo et al. ................ 248/159
5,100,134 A * 3/1992 Becker ....................... 473/417
5,222,344 A 6/1993 Johnson
5,386,986 A * 2/1995 Gamboa ..................... 473/430
5,661,946 A 9/1997 Davis
5,876,011 A * 3/1999 Blasing ...................... 248/411

* cited by examiner

*Primary Examiner*—Amy J Sterling

(57) ABSTRACT

An adjustable utility wire-holding apparatus includes a partitioned pole which includes top, middle and bottom segments detachably connected to each other along an end-to-end pattern respectively. The apparatus further includes a base member, and a mechanism for freely rotating at least one of the top, middle and bottom segments. The apparatus further includes a mechanism for freely articulating the base member about the longitudinal axis while the middle and top segments remain statically disposed at a stationary position, and a mechanism for selectively biasing the base member between aligned and unaligned positions such that the base member becomes oriented along a single axis defined along a horizontal plane registered orthogonal to the longitudinal axis.

12 Claims, 4 Drawing Sheets

UTILITY WIRE-HOLDING APPARATUS AND ASSOCIATED METHOD

CROSS REFERENCE TO RELATED APPLICATIONS

This application claims the benefit of U.S. Provisional Application No. 60/905,591, filed Mar. 8, 2007, the entire disclosures of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Technical Field

This invention relates to wires and, more particularly, to a utility wire-holding apparatus for preventing an existing utility wire from being inadvertently torn down by an existing construction vehicle at a construction site.

2. Prior Art

During the course of constructing a new building or residence it is necessary to have a reliable supply of electricity in order to operate certain tools and machinery. As such, one often finds utility wires coursing their way about the construction site. Unfortunately, these wires are not easily seen if one is not specifically looking for them, thus it is not uncommon that utility wires inadvertently become torn or disconnected by personnel operating machinery and the like. This can cause majors hassles and significant delays in the construction of the structure. Obviously, it would be advantageous to provide a means for placing such utility wires and the like out of harms way.

U.S. Pat. No. 5,222,344 to Johnson discloses a pole for supporting utility lines, and the like is made of pultruded composites. In one embodiment, an interior lattice of composite members forms an elongated open-celled beam which is enclosed in a preferably composite outer skin. In another embodiment pole side panels are pultruded to define interlocking edges so they can be laid parallel to define an enclosure with the edges interfitting. Unfortunately, this prior art example is not designed to be used on any construction site.

U.S. Pat. No. 5,661,946 to Davis discloses a pole top extension assembly for mounting a wooden extension bayonet having a rectangular cross section to the flattened top of a cylindrical wooden utility pole. The pole top extension assembly comprising a pair of bracket members each having leg portions extending downwardly from the top of the wooden utility pole, and each bracket member further having a matingly inter-engageable portion which couples the said bracket members together over the top of the pole. At least one of said bracket members includes a rectangular collar opening upwardly to receive a bayonet member therein, with said rectangular collar having two pairs of opposite side walls oriented, respectively, substantially parallel and perpendicular to said leg portions. Unfortunately, this prior art example does not keep utility wires raised to an elevated position in order to keep construction vehicles from accidentally tearing them down.

Accordingly, the present invention is disclosed in order to overcome the above noted shortcomings. The adjustable utility wire-holding apparatus is convenient and easy to use, lightweight yet durable in design, and designed for preventing an existing utility wire from being inadvertently torn down by an existing construction vehicle at a construction site. The apparatus is simple to use, inexpensive, and designed for many years of repeated use.

BRIEF SUMMARY OF THE INVENTION

In view of the foregoing background, it is therefore an object of the present invention to provide an apparatus for preventing an existing utility wire from being inadvertently torn down by an existing construction vehicle at a construction site. These and other objects, features, and advantages of the invention are provided by an adjustable utility wire-holding apparatus.

An adjustable utility wire-holding apparatus includes a partitioned pole which includes top, middle and bottom segments detachably connected to each other along an end-to-end pattern respectively. The apparatus further includes a base member removably coupled directly to the bottom segment, and a mechanism for freely rotating at least one of the top, middle and bottom segments about a centrally registered longitudinal axis of the partitioned pole while at least another one of the top, middle and bottom segments remains statically disposed at a stationary position.

Such a freely rotating mechanism includes a first rectilinear coupling with axially opposed top and bottom halves interfitted within bottom and top ends of the top and middle segments respectively. Such a first rectilinear coupling effectively has an annular ridge concentrically extending about an entire circumference thereof and thereby defines a shoulder on which the bottom end of the top segment contiguously lays. The top segment is freely rotatable about the top half of the first coupling while seated on the shoulder thereof, and a first fastener is directly connected to a top end of the middle segment and the bottom half of the first coupling such that the middle segment and the first coupling rotate in sync while the top segment remains stationary.

The apparatus further includes a mechanism for freely articulating the base member about the longitudinal axis while the middle and top segments remain statically disposed at a stationary position. Such a freely articulating mechanism includes a second rectilinear coupling with axially opposed top and bottom halves interfitted within bottom and top ends of the middle and bottom segments respectively. Such a second rectilinear coupling conveniently has an annular ridge concentrically extending about an entire circumference thereof and thereby defining a shoulder on which the bottom end of the middle segment contiguously lays. The middle segment is freely rotatable about the top half of the second coupling while seated on the shoulder thereof, and a second fastener is directly connected to a top end of the bottom segment and the bottom half of the second coupling such that the bottom segment and the second coupling rotate in sync while the middle segment remains stationary.

The apparatus further includes a mechanism for selectively biasing the base member between aligned and unaligned positions such that the base member becomes advantageously oriented along a single axis defined along a horizontal plane registered orthogonal to the longitudinal axis. Such a selectively biasing mechanism includes first and second rectilinear base member segments disposed at a vertically stacked orientation, and a fastening member upwardly penetrating through the first and second base member segments and being interfitted directly with a bottom end of the bottom segment of the partitioned pole.

Such a first base member segment is permanently and statically oriented along the single axis, and such a second base member segment is freely rotated and positioned along a 360 degree arcuate path such that the second base member segment is effectively selectively articulated between first and second directions defined parallel and orthogonal to the single axis respectively. The first base member segment is positioned above the second base member segment and is provided with a pair of axially opposed sleeves monolithically formed at the opposed ends thereof. Further, the second base member segment has axially opposed ends that are freely glided through the sleeves during rotational movement and are further seated within the sleeves when the second base member segment is aligned along the single axis. The first and second base member segments have longitudinal lengths registered parallel to each other when the first and second base member segments are aligned along the single axis. A plurality of brackets is directly coupled to a top end of the top segment.

A method for preventing an existing utility wire from being inadvertently torn down by an existing construction vehicle at a construction site includes the steps of: providing a partitioned pole including top, middle and bottom segments; detachably connecting the top, middle and bottom segments to each other along an end-to-end pattern respectively; providing and removably coupling a base member directly to the bottom segment; freely rotating at least one of the top, middle and bottom segments about a centrally registered longitudinal axis of the partitioned pole while at least another one of the top, middle and bottom segments remains statically disposed at a stationary position; freely articulating the base member about the longitudinal axis while the middle and top segments remain statically disposed at a stationary position; selectively biasing the base member between aligned and unaligned positions such that the base member becomes oriented along a single axis defined along a horizontal plane registered orthogonal to the longitudinal axis; and providing and directly coupling a plurality of brackets to a top end of the top segment.

The method further includes the steps of: providing a first rectilinear coupling; interfitting axially opposed top and bottom halves of the first coupling within bottom and top ends of the top and middle segments respectively; contiguously laying the bottom end of the top segment on a shoulder defined by an annular ridge of the first coupling; freely rotating the top segment about the top half of the first coupling while being seated on the shoulder thereof; providing and connecting a first fastener directly to .a top end of the middle segment and the bottom half of the first coupling; and synchronously rotating the middle segment and the first coupling while the top segment remains stationary.

The method further includes the steps of: providing a second rectilinear coupling; interfitting axially opposed top and bottom halves of the second coupling within bottom and top ends of the middle and bottom segments respectively; contiguously laying the bottom end of the middle segment on a shoulder defined by an annular ridge of the second rectilinear coupling; freely rotating the middle segment about the top half of the second coupling while seated on the shoulder thereof; providing and connecting a second fastener directly to a top end of the bottom segment and the bottom half of the second coupling; and synchronously rotating the bottom segment and the second coupling while the middle segment remains stationary.

The method further includes the steps of: providing and disposing first and second rectilinear base member segments at a vertically stacked orientation; providing and penetrating a fastening member upwardly through the first and second base member segments by interfitting the fastening member directly with a bottom end of the bottom segment of the partitioned pole; permanently and statically orienting the first base member segment along the single axis; and freely rotating and positioning the second base member segment along a 360 degree arcuate path by selectively articulating the second base member segment between first and second directions defined parallel and orthogonal to the single axis respectively.

The method further includes the steps of: positioning the first base member segment above the second base member segment; freely gliding axially opposed ends of the second base member segment through a pair of axially opposed sleeves monolithically formed at the opposed ends of the first base member during rotational movement; and seating the axially opposed ends of the second base member within the sleeves by aligning the second base member segment along the single axis.

The method further includes the step of: registering respective longitudinal lengths of the first and second base member segments parallel to each other by aligning the first and second base member segments along the single axis.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
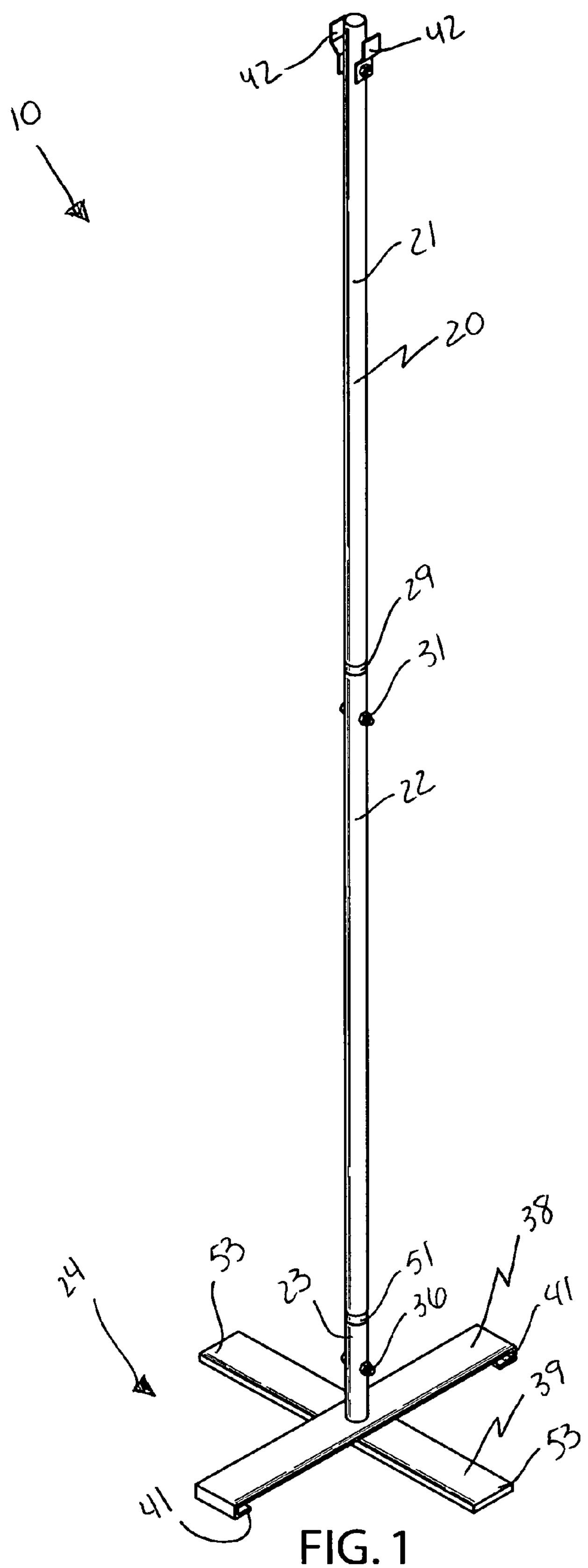
FIG. 1 is a perspective view of an adjustable utility wire-holding apparatus, in accordance with the present invention.
Figure 2:
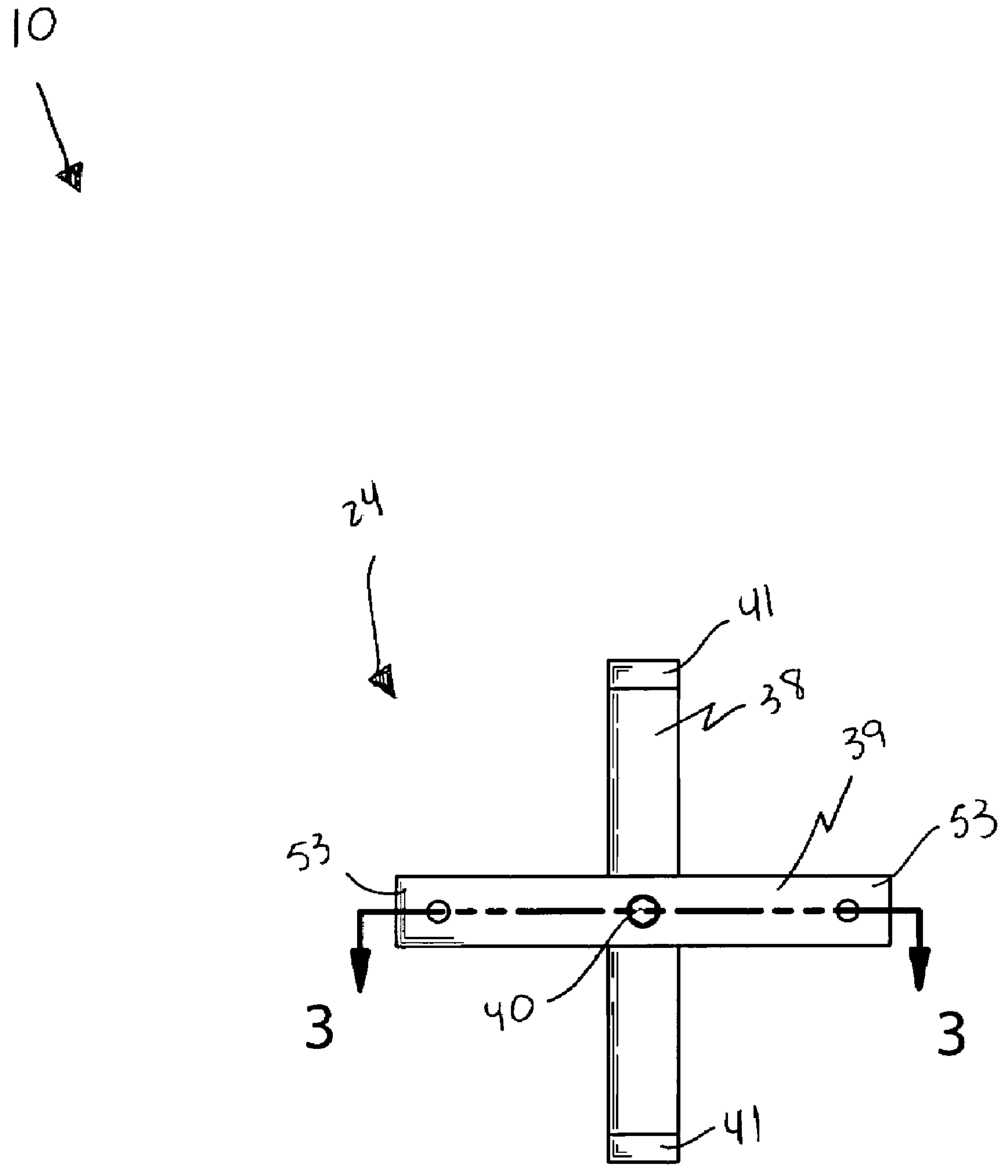
FIG. 2 is a bottom planar view of the adjustable utility wire-holding apparatus, in accordance with the present invention.
Figure 3:
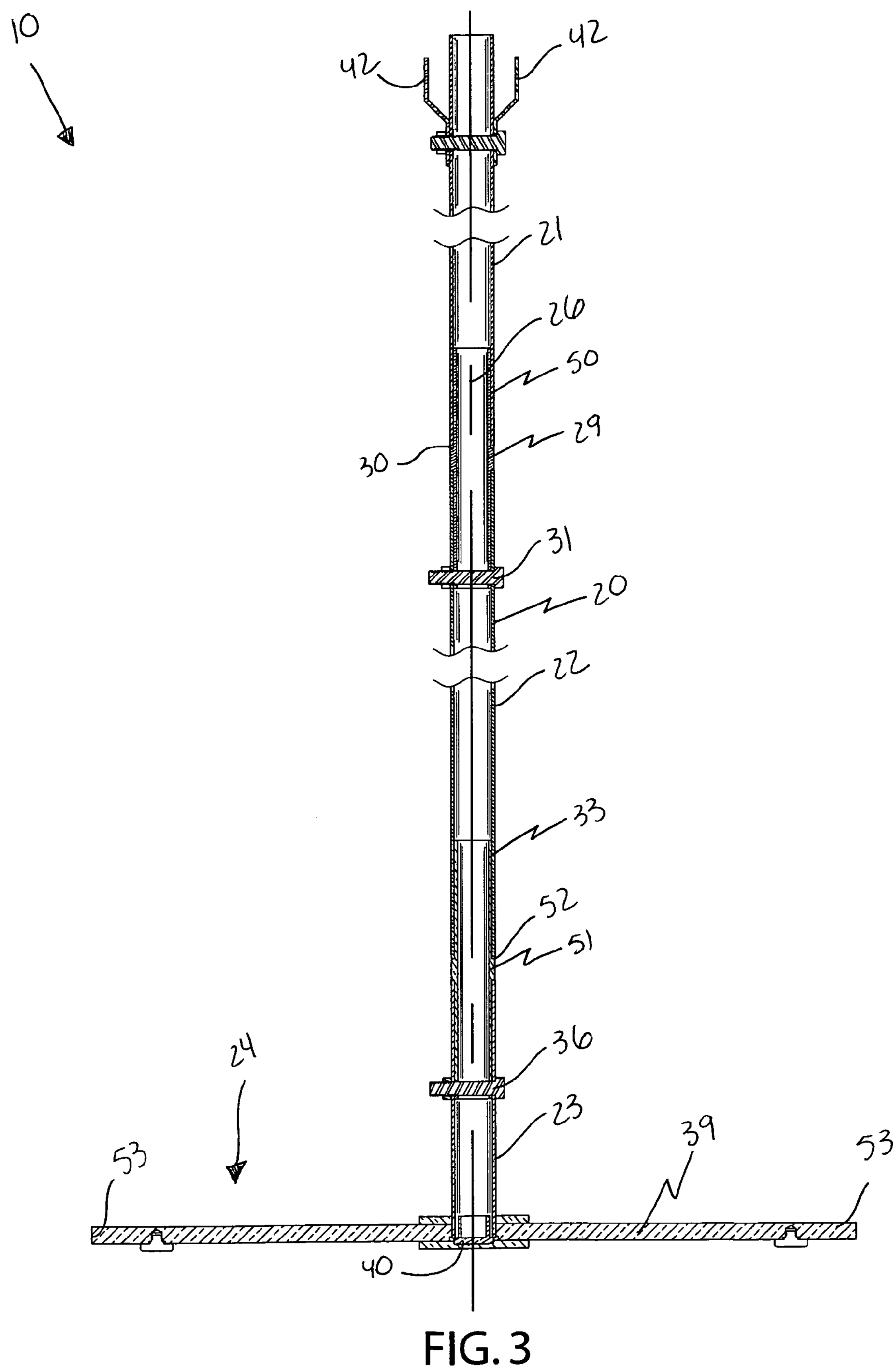
FIG. 3 is a cross sectional view of the adjustable utility wire-holding apparatus, taken along line 3-3, as seen in FIG. 2.
Figure 4:
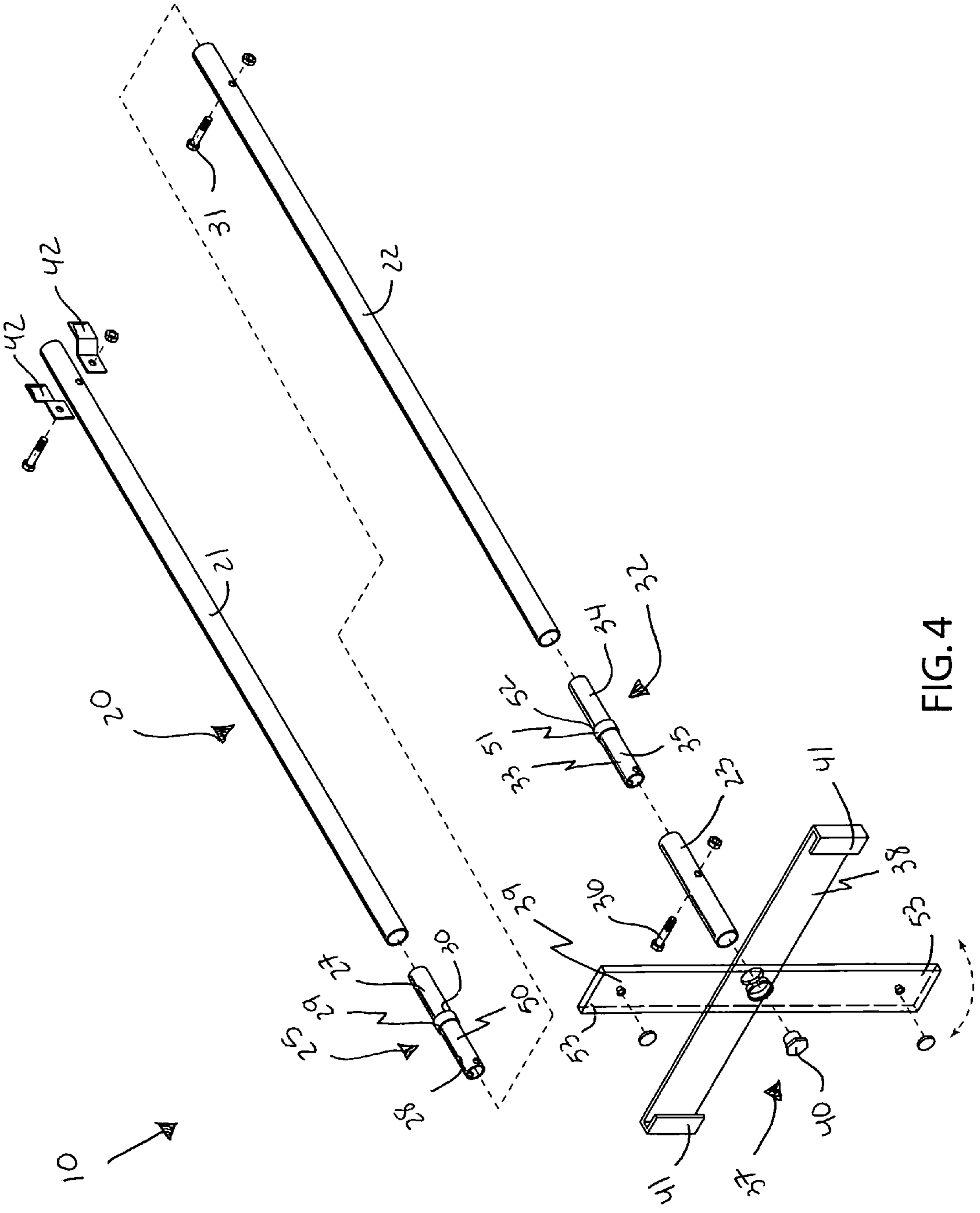
FIG. 4 is an exploded and perspective view of the adjustable utility wire-holding apparatus, in accordance with the present invention.

The apparatus of this invention is referred to generally in FIGS. 1-4 by the reference numeral 10 and is intended to protect an adjustable utility wire-holding apparatus. It should be understood that the apparatus 10 may be used to hold many different types of wires and should not be limited to holding those types of wires mentioned herein.

Figure 1A:
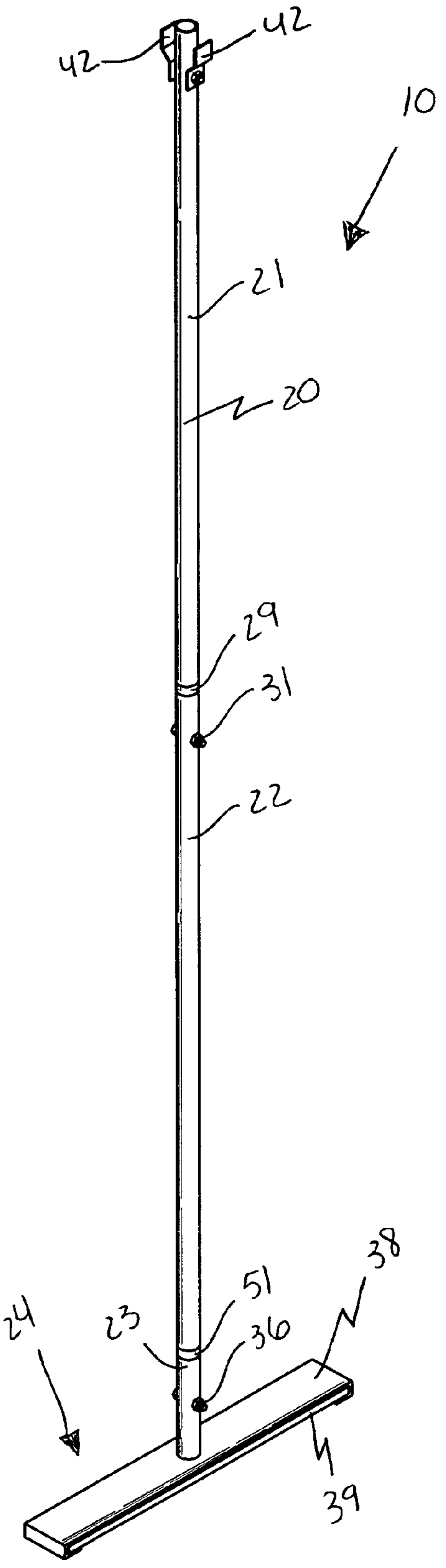
FIG. 1*a* is a perspective view of the adjustable utility wire-holding apparatus, showing the adjustment of the base member, in accordance with the present invention.

Referring initially to FIGS. 1, 1*a*, 3 and 4, an adjustable utility wire-holding apparatus 10 includes a partitioned pole 20 which includes top, middle and bottom segments 21, 22, 23 detachably connected to each other along an end-to-end pattern respectively. The apparatus 10 further includes a base member 24 removably coupled directly, without the use of intervening elements, to the bottom segment 23, and a mechanism 25 for freely rotating at least one of the top, middle and bottom segments 21, 22, 23 about a centrally registered longitudinal axis 26 of the partitioned pole while at least another one of the top, middle and bottom segments 21, 22, 23 remains statically disposed at a stationary position. Such a freely rotating mechanism 25 includes a first rectilinear coupling 50 with axially opposed top and bottom halves 27, 28 interfitted within bottom and top ends of the top and middle segments 21, 23 respectively.

Such a first rectilinear coupling 50 has an annular ridge 29 concentrically extending about an entire circumference thereof and thereby defines a shoulder 30 on which the bottom end of the top segment 21 contiguously lays. The top segment 21 is freely rotatable about the top half 27 of the first coupling 50 while seated on the shoulder 30 thereof, and a first fastener 31 is directly connected, without the use of intervening elements, to a top end of the middle segment 22 and the bottom half 28 of the first coupling 50 which is essential such that the middle segment 22 and the first coupling 30 rotate in sync while the top segment 21 remains stationary. The pole 20 is partitioned into three segments 21, 22, 23 in order to enable a user to rotate only selective segments at a given time.

Referring again to FIGS. 1, 1*a*, 3 and 4, the apparatus 10 further includes a mechanism 32 for freely articulating the base member 24 about the longitudinal axis 26 while the middle and top segments 22, 21 remain statically disposed at a stationary position. Such a freely articulating mechanism 32 includes a second rectilinear coupling 33 with axially opposed top and bottom halves 34, 35 interfitted within bottom and top ends of the middle and bottom segments 22, 23 respectively. Such a second rectilinear coupling 33 has an annular ridge 51 concentrically extending about an entire circumference thereof and thereby defining a shoulder 52 on which the bottom end of the middle segment 22 contiguously lays. The middle segment 22 is freely rotatable about the top half 34 of the second coupling 33 while seated on the shoulder thereof, and a second fastener 36 is directly connected, without the use of intervening elements, to a top end of the bottom segment 23 and the bottom half 35 of the second coupling 33 which is important such that the bottom segment 23 and the second coupling 33 rotate in sync while the middle segment 22 remains stationary.

Referring to FIGS. 1, 1*a*, 2, 3 and 4, the apparatus 10 further includes a mechanism 37 for selectively biasing the base member 24 between aligned and unaligned positions such that the base member 24 becomes oriented along a single axis defined along a horizontal plane registered orthogonal to the longitudinal axis. Such a selectively biasing mechanism 37 includes first and second rectilinear base member segments 38, 39 disposed at a vertically stacked orientation, and a fastening member 40 upwardly penetrating through the first and second base member segments 38, 39 and being interfitted directly, without the use of intervening elements, with a bottom end of the bottom segment 23 of the partitioned pole.

Such a first base member segment 38 is permanently and statically oriented along the single axis, and such a second base member segment 39 is freely rotated and positioned along a 360 degree arcuate path which is vital such that the second base member segment 39 is selectively articulated between first and second directions defined parallel and orthogonal to the single axis respectively. The first base member segment 38 is positioned above the second base member segment 39 and is provided with a pair of axially opposed sleeves 41 monolithically formed at the opposed ends thereof.

Further, the second base member segment 39 has axially opposed ends 53 that are freely glided through the sleeves 41 during rotational movement and are further seated within the sleeves 41 when the second base member segment 39 is aligned along the single axis. The first and second base member segments 38, 39 have longitudinal lengths registered parallel to each other when the first and second base member segments 38, 39 are aligned along the single axis. A plurality of brackets 42 is directly coupled, without the use of intervening elements, to a top end of the top segment. The brackets 42 may be used to support wires above the partitioned pole 20.

The apparatus includes a sectional pole that has a base member directly attached thereto, without the use of intervening elements, which is essential for supporting the pole in an upright position. The pole may be produced from 1 inch, polyvinyl chloride (PVC) plastic and includes three sections. Of course, the pole may be produced in a variety of diameters and from alternate suitable materials, as is obvious to a person of ordinary skill in the art. The bottom section may be 6 inches in length and directly attached, without the use of intervening elements, to the base member.

Such a base member may include a pair of 30 inch arms that are arranged in an X-shaped configuration. The middle and top sections may be 78 inches in length each, and when all three sections are joined together, the total height of the pole is 16 feet. Of course, the pole may be produced in a variety of lengths, as is obvious to a person of ordinary skill in the art. The pole sections may be joined together by six inch, PVC sleeves and ¼ inch by 1¼ inch metal bolt fasteners, for example. Such sleeves have annular apertures that may be aligned with corresponding apertures on the pole sections, prior to threading the bolt fasteners into the apertures to securely join the sections together. Before the apparatus is erected, a pair of cable clamps may be attached to the upper section and secured thereto using a 5/16 inch×1½ inch bolt fastener, for example. All of the fasteners and clamps are supplied with the apparatus.

The present invention, as claimed, provides the unexpected and unpredictable benefit of an apparatus that is convenient and easy to use, is durable yet lightweight in design, is versatile in its applications, and provides a convenient means of keeping utility wires raised to an elevated position in order to keep construction vehicles from accidentally tearing them down. Such an apparatus can thus save the workers a considerable amount of time and frustration by preventing the utility wires from being torn down in the first place.

In use, a method for preventing an existing utility wire from being inadvertently torn down by an existing construction vehicle at a construction site includes the steps of: providing a partitioned pole 20 including top, middle and bottom segments 21, 22, 23; detachably connecting the top, middle and bottom segments 21, 22, 23 to each other along an end-to-end pattern respectively; providing and removably coupling a base member 24 directly, without the sue of intervening elements, to the bottom segment 23; freely rotating at least one of the top, middle and bottom segments 21, 22, 23 about a centrally registered longitudinal axis 26 of the partitioned pole 20 while at least another one of the top, middle and bottom segments 21, 22, 23 remains statically disposed at a stationary position; freely articulating the base member 24 about the longitudinal axis 26 while the middle and top segments 22, 23 remain statically disposed at a stationary position; selectively biasing the base member 24 between aligned and unaligned positions such that the base member 24 becomes oriented along a single axis defined along a horizontal plane registered orthogonal to the longitudinal axis 26; and providing and directly coupling, without the use of intervening elements, a plurality of brackets 42 to a top end of the top segment 21.

In use, the method further includes the steps of: providing a first rectilinear coupling 50; interfitting axially opposed top and bottom halves 27, 28 of the first coupling 50 within bottom and top ends of the top and middle segments 21, 22 respectively; contiguously laying the bottom end of the top segment 21 on a shoulder 30 defined by an annular ridge 29 of the first coupling 50; freely rotating the top segment 21 about the top half 27 of the first coupling 50 while being seated on the shoulder thereof; providing and connecting a first fastener 31 directly, without the use of intervening elements, to a top end of the middle segment 22 and the bottom half 28 of the first coupling 50; and synchronously rotating the middle segment 22 and the first coupling 50 while the top segment 21 remains stationary.

In use, the method further includes the steps of: providing a second rectilinear coupling 33; interfitting axially opposed top and bottom halves 34, 35 of the second coupling 33 within bottom and top ends of the middle and bottom segments 22, 23 respectively; contiguously laying the bottom end of the middle segment 22 on a shoulder 52 defined by an annular ridge 51 of the second rectilinear coupling 33; freely rotating the middle segment 22 about the top half 34 of the second coupling 33 while seated on the shoulder 52 thereof; providing and connecting a second fastener 36 directly to a top end of the bottom segment 23 and the bottom half 35 of the second coupling 33; and synchronously rotating the bottom segment 23 and the second coupling 33 while the middle segment 22 remains stationary.

In use, the method further includes the steps of: providing and disposing first and second rectilinear base member segments 38, 39 at a vertically stacked orientation; providing and penetrating a fastening member 40 upwardly through the first and second base member segments 38, 39 by interfitting the fastening member directly with a bottom end of the bottom segment of the partitioned pole; permanently and statically orienting the first base member segment 38 along the single axis; and freely rotating and positioning the second base member 39 segment along a 360 degree arcuate path by selectively articulating the second base member segment 39 between first and second directions defined parallel and orthogonal to the single axis respectively.

In use, the method further includes the steps of: positioning the first base member segment 38 above the second base member segment 39; freely gliding axially opposed ends 53 of the second base member segment 39 through a pair of axially opposed sleeves 41 monolithically formed at the opposed ends of the first base member 38 during rotational movement; and seating the axially opposed ends 53 of the second base member 39 within the sleeves 41 by aligning the second base member segment 39 along the single axis.

In use, the method further includes the step of: registering respective longitudinal lengths of the first and second base member segments 38, 39 parallel to each other by aligning the first and second base member segments 38, 39 along the single axis.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An adjustable utility wire-holding apparatus for preventing an existing utility wire from being inadvertently torn down by an existing construction vehicle at a construction site, said adjustable utility wire-holding apparatus comprising:

a partitioned pole including top, middle and bottom segments detachably connected to each other along an end-to-end pattern respectively;

a base member removably coupled directly to said bottom segment;

means for freely rotating at least one of said top, middle and bottom segments about a centrally registered longitudinal axis of said partitioned pole while at least another one of said top, middle and bottom segments remains statically disposed at a stationary position;

means for freely articulating said base member about the longitudinal axis while said middle and top segments remain statically disposed at a stationary position; and means for selectively biasing said base member between aligned and unaligned positions such that said base member becomes oriented along a single axis defined along a horizontal plane registered orthogonal to the longitudinal axis.

2. The adjustable utility wire-holding apparatus of claim 1, wherein said freely rotating means comprises:

a first cylindrical coupling having axially opposed top and bottom halves interfitted within bottom and top ends of said top and middle segments respectively, said first cylindrical coupling having an annular ridge concentrically extending about an entire circumference thereof and thereby defining a shoulder on which said bottom end of said top segment contiguously lays, said top segment being freely rotatable about said top half of said first coupling while seated on said shoulder thereof; and a first fastener directly connected to a top end of said middle segment and said bottom half of said first coupling such that said middle segment and said first coupling rotate in sync while said top segment remains stationary.

3. The adjustable utility wire-holding apparatus of claim 2, wherein said freely articulating means comprises:

a second cylindrical coupling having axially opposed top and bottom halves interfitted within bottom and top ends of said middle and bottom segments respectively, said second cylindrical coupling having an annular ridge concentrically extending about an entire circumference thereof and thereby defining a shoulder on which said bottom end of said middle segment contiguously lays, said middle segment being freely rotatable about said top half of said second coupling while seated on said shoulder thereof; and a second fastener directly connected to a top end of said bottom segment and said bottom half of said second coupling such that said bottom segment and said second coupling rotate in sync while said middle segment remains stationary.

4. The adjustable utility wire-holding apparatus of claim 3, wherein said selectively biasing means comprises:

first and second rectilinear base member segments disposed at a vertically stacked orientation;

a fastening member upwardly penetrating through said first and second base member segments and being interfitted directly with a bottom end of said bottom segment of said partitioned pole;

wherein said first base member segment is permanently and statically oriented along said single axis, said second base member segment being freely rotated and positioned along a 360 degree arcuate path such that said second base member segment is selectively articulated between first and second directions defined parallel and orthogonal to said single axis respectively.

5. The adjustable utility wire-holding apparatus of claim 4, wherein said first base member segment is positioned above said second base member segment and is provided with a pair of axially opposed sleeves monolithically formed at said opposed ends thereof, said second base member segment having axially opposed ends that are freely glided through said sleeves during rotational movement and are further seated within said sleeves when said second base member segment is aligned along said single axis.

6. The adjustable utility wire-holding apparatus of claim 5, wherein said first and second base member segments have longitudinal lengths registered parallel to each other when said first and second base member segments are aligned along said single axis.

7. An adjustable utility wire-holding apparatus for preventing an existing utility wire from being inadvertently torn down by an existing construction vehicle at a construction site, said adjustable utility wire-holding apparatus comprising:

a partitioned pole including top, middle and bottom segments detachably connected to each other along an end-to-end pattern respectively;

a base member removably coupled directly to said bottom segment;

means for freely rotating at least one of said top, middle and bottom segments about a centrally registered longitudinal axis of said partitioned pole while at least another one of said top, middle and bottom segments remains statically disposed at a stationary position;

means for freely articulating said base member about the longitudinal axis while said middle and top segments remain statically disposed at a stationary position;

means for selectively biasing said base member between aligned and unaligned positions such that said base member becomes oriented along a single axis defined along a horizontal plane registered orthogonal to the longitudinal axis; and a plurality of brackets directly coupled to a top end of said top segment.

8. The adjustable utility wire-holding apparatus of claim 7, wherein said freely rotating means comprises:

a first cylindrical coupling having axially opposed top and bottom halves interfitted within bottom and top ends of said top and middle segments respectively, said first cylindrical coupling having an annular ridge concentrically extending about an entire circumference thereof and thereby defining a shoulder on which said bottom end of said top segment contiguously lays, said top segment being freely rotatable about said top half of said first coupling while seated on said shoulder thereof; and a first fastener directly connected to a top end of said middle segment and said bottom half of said first coupling such that said middle segment and said first coupling rotate in sync while said top segment remains stationary.

9. The adjustable utility wire-holding apparatus of claim 8, wherein said freely articulating means comprises:

a second cylindrical coupling having axially opposed top and bottom halves interfitted within bottom and top ends of said middle and bottom segments respectively, said second cylindrical coupling having an annular ridge concentrically extending about an entire circumference thereof and thereby defining a shoulder on which said bottom end of said middle segment contiguously lays, said middle segment being freely rotatable about said top half of said second coupling while seated on said shoulder thereof; and a second fastener directly connected to a top end of said bottom segment and said bottom half of said second coupling such that said bottom segment and said second coupling rotate in sync while said middle segment remains stationary.

10. The adjustable utility wire-holding apparatus of claim 9, wherein said selectively biasing means comprises:

first and second rectilinear base member segments disposed at a vertically stacked orientation;

a fastening member upwardly penetrating through said first and second base member segments and being interfitted directly with a bottom end of said bottom segment of said partitioned pole;

wherein said first base member segment is permanently and statically oriented along said single axis, said second base member segment being freely rotated and positioned along a 360 degree arcuate path such that said second base member segment is selectively articulated between first and second directions defined parallel and orthogonal to said single axis respectively.

11. The adjustable utility wire-holding apparatus of claim 10, wherein said first base member segment is positioned above said second base member segment and is provided with a pair of axially opposed sleeves monolithically formed at said opposed ends thereof, said second base member segment having axially opposed ends that are freely glided through said sleeves during rotational movement and are further seated within said sleeves when said second base member segment is aligned along said single axis.

12. The adjustable utility wire-holding apparatus of claim 10, wherein said first and second base member segments have longitudinal lengths registered parallel to each other when said first and second base member segments are aligned along said single axis.

* * * * *